US011465855B2

(12) United States Patent
Shinomiya et al.

(10) Patent No.: US 11,465,855 B2
(45) Date of Patent: Oct. 11, 2022

(54) POWDER/GRANULAR MATERIAL SPREADER

(71) Applicant: YAMAHA HATSUDOKI KABUSHIKI KAISHA, Iwata (JP)

(72) Inventors: Ryu Shinomiya, Shizuoka (JP); Masanori Yoshihara, Shizuoka (JP); Daisuke Hirajo, Shizuoka (JP); Masaru Nakazawa, Nagano (JP); Satoshi Kato, Nagano (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 405 days.

(21) Appl. No.: 16/817,899

(22) Filed: Mar. 13, 2020

(65) Prior Publication Data

US 2020/0288695 A1    Sep. 17, 2020

(30) Foreign Application Priority Data

Mar. 15, 2019   (JP) .............................. JP2019-048651

(51) Int. Cl.
   *B65G 31/04* (2006.01)
   *B64C 39/02* (2006.01)
   *B64D 1/16* (2006.01)

(52) U.S. Cl.
   CPC ............ *B65G 31/04* (2013.01); *B64C 39/024* (2013.01); *B64D 1/16* (2013.01); *B64C 2201/027* (2013.01); *B64C 2201/12* (2013.01)

(58) Field of Classification Search
   CPC ................ B65G 31/04; B65G 69/0466; B65G 2812/15; A01C 17/001; A01M 9/0061
   (Continued)

(56) References Cited

U.S. PATENT DOCUMENTS 3,204,896 A * 9/1965 Smith et al. ......... A01C 17/001
                                                244/136
3,995,569 A * 12/1976 Picardat ............... A01B 51/026
                                                172/709

(Continued)

FOREIGN PATENT DOCUMENTS

JP         2006-149265 A      6/2006
JP         2008-167703 A      7/2008
(Continued)

*Primary Examiner* — Joseph A Dillon, Jr.
(74) *Attorney, Agent, or Firm* — Keating and Bennett, LLP

(57) ABSTRACT

A powder/granular material spreader that allows easy cleaning of a passage for powder/granular material includes a housing that houses motors, a passage that extends through the housing and provides a passage for the powder/granular material, a roller provided in the passage to feed the powder/granular material and that is driven by one of the motors, and a spinner driven by the motor to spread the powder/granular material. The passage includes an integral first wall that shields the motor from the passage, an integral second wall that shields the motor from the passage, and an opening located at an inlet of the passage. The opening is integral with the first wall and the second wall. The housing includes an integral cover that covers tops and sides of the motors, and fits over an outer surface of the opening. A seal is provided at a location where the opening and the cover are connected with each other.

4 Claims, 10 Drawing Sheets

(58) Field of Classification Search
USPC .................................. 198/642; 239/668, 669
See application file for complete search history.

(56) References Cited

U.S. PATENT DOCUMENTS

| | | | | |
|---|---|---|---|---|
| 4,395,002 | A * | 7/1983 | Kantojarvi | B64D 1/16 239/681 |
| 8,016,169 | B2 * | 9/2011 | Blandini | A01C 17/001 222/626 |
| 8,201,759 | B2 * | 6/2012 | Kendall | A01C 17/001 239/650 |
| 9,315,960 | B2 * | 4/2016 | Kime | E01C 19/203 |
| 9,458,585 | B2 * | 10/2016 | Phelps | E01H 10/007 |
| 10,611,552 | B2 * | 4/2020 | Messaros | A01M 25/00 |
| D904,968 | S * | 12/2020 | Jiang | D12/345 |
| 10,988,256 | B2 * | 4/2021 | O'Hara | B64C 39/024 |
| 11,045,827 | B2 * | 6/2021 | Anderson | A01C 17/006 |
| 11,083,129 | B2 * | 8/2021 | Knepper | B64C 25/04 |
| 2014/0246213 | A1 * | 9/2014 | Karagounis | A62C 99/0072 169/53 |
| 2017/0042137 | A1 * | 2/2017 | Mercier | E01H 8/10 |
| 2017/0202133 | A1 * | 7/2017 | Rosenbaum | A01C 7/02 |
| 2017/0202135 | A1 * | 7/2017 | Sides | A01C 15/007 |
| 2019/0168874 | A1 * | 6/2019 | Steelman | A01C 7/166 |
| 2020/0137946 | A1 * | 5/2020 | Chang | A01M 7/0089 |
| 2020/0188947 | A1 * | 6/2020 | Sevrey | B05B 12/002 |
| 2020/0305340 | A1 * | 10/2020 | Knepper | A01C 7/125 |
| 2021/0329828 | A1 * | 10/2021 | Su | B64C 39/024 |
| 2021/0347479 | A1 * | 11/2021 | Bennett | A01B 79/02 |
| 2021/0402427 | A1 * | 12/2021 | Gray | E01C 19/203 |
| 2022/0007567 | A1 * | 1/2022 | Reabow | A01C 21/005 |
| 2022/0174860 | A1 * | 6/2022 | Sevrey | B05B 11/0008 |

FOREIGN PATENT DOCUMENTS

| | | | |
|---|---|---|---|
| JP | 5498409 B2 | | 5/2014 |
| KR | 10-1658612 B1 | | 9/2016 |
| KR | 102345104 B1 | * | 12/2021 |
| WO | WO 2018/170594 | * | 9/2018 |

* cited by examiner

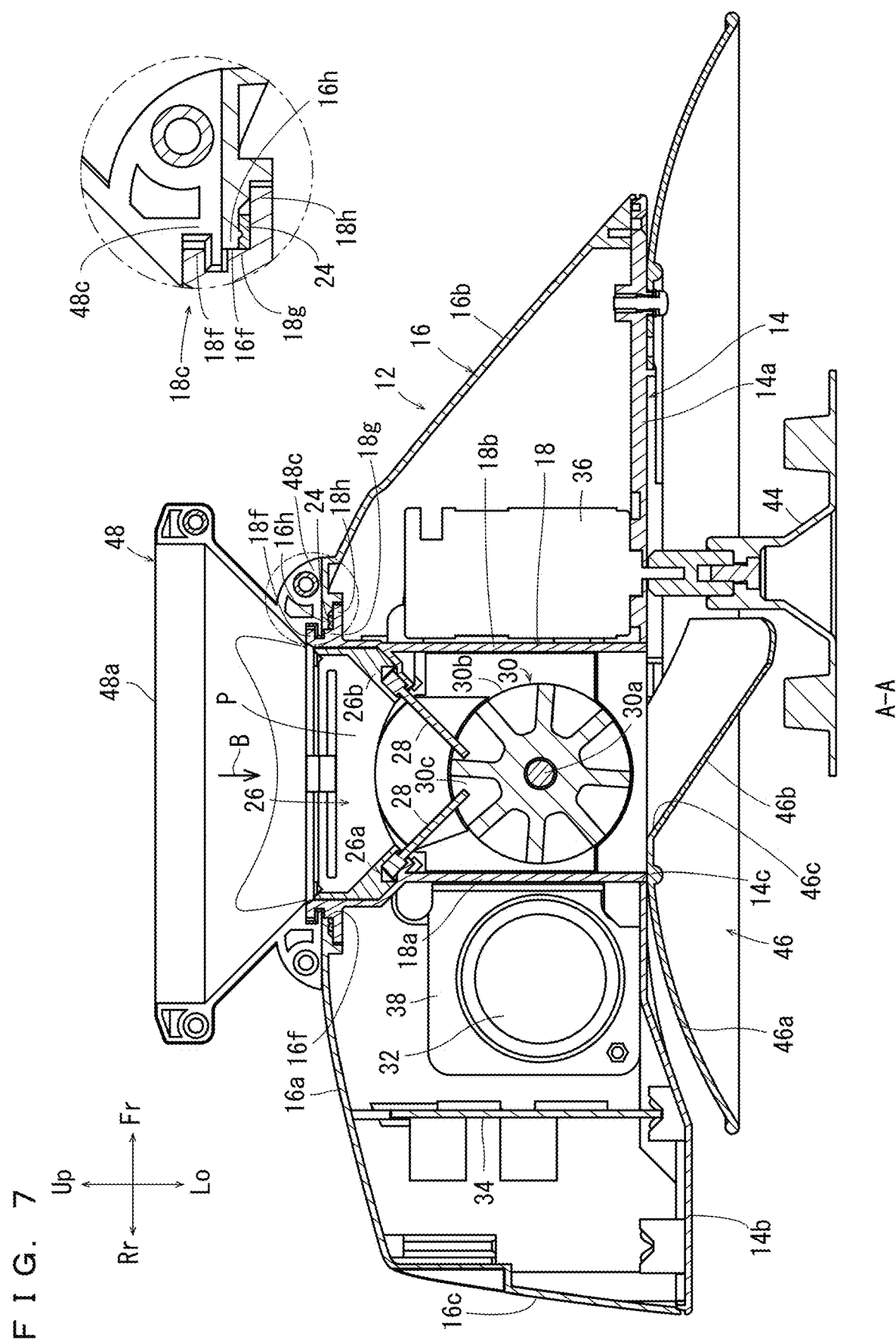

POWDER/GRANULAR MATERIAL SPREADER

CROSS REFERENCE TO RELATED APPLICATIONS

This application claims the benefit of priority to Japanese Patent Application No. 2019-048651 filed on Mar. 15, 2019. The entire contents of this application are hereby incorporated herein by reference.

BACKGROUND OF THE INVENTION

1. Field of the Invention

The present invention relates to powder/granular material spreaders, and more specifically to a powder/granular material spreader installed in transport equipment.

2. Description of the Related Art

An example of conventional techniques in this field is disclosed in JP-A 2006-149265. JP-A 2006-149265 discloses a chemical spreader including a tank for storage of a chemical, and a spreading section provided below the tank for application of the chemical supplied from the tank. The spreading section includes a rotor for metering the chemical from the tank to a desired amount, a motor attached to an end of the rotor, and a spinner for application of the chemical metered by the rotor. The rotor, the motor and the spinner are inside the spreading section. More specifically, the rotor and the motor are inside a chute, while the spinner is below the chute.

When applying a granular material onto a crop field with the chemical spreader as described above, the granular material is first supplied from the tank to a surface of the rotor in the spreading section, then is passed through the chute and falls onto the spinner as the rotor rotates, and then is spread onto the crop field there below as the spinner spins. During the application operation, some of the granular material becomes powdery and tends to stick onto areas near the rotor inside the chute. If the chemical spreader is continued to be used under this condition, granular material near the rotor becomes difficult to fall, i.e., the granular material becomes less flowable, resulting in increased consumption of electric power. Therefore, it is necessary to clean the inside of the chute of the spreading section appropriately. Since the motor is disposed inside the chute of the spreading section, cleaning the chute by spraying water inside poses a problem that water or the powdery granular material will reach the motor. Therefore, the motor must be removed from the chemical spreader before cleaning the inside of the chute with water.

SUMMARY OF THE INVENTION

Preferred embodiments of the present invention provide powder/granular material spreaders which allow easy cleaning of a passage for powder/granular material.

According to a preferred embodiment of the present invention, a powder/granular material spreader includes a first driver; a housing that houses the first driver; a second driver; a passage section extending through the housing and defining a passage for a powder/granular material; a feeder which is provided in the passage to feed the powder/granular material supplied from an inlet of the passage to an outlet of the passage and is driven by the first driver; and a spreader driven by the second driver to spread the powder/granular material delivered from the outlet of the passage. In the spreader, the passage section includes an integral first wall that shields the first driver from the passage.

In the preferred embodiment described above, the first driver is housed in the housing, and not in the passage for the powder/granular material. Therefore, even if water is sprayed into the passage to clean the passage where the feeder is located, it is possible to reduce or prevent water or fine particles of powdery/granular material from reaching the first driver. Also, when viewed from the passage, the first driver inside the housing is shielded by the first wall. Therefore, even if water is sprayed into the passage, water or fine particles of powder/granular material does not reach the first driver directly. As a result, it is possible to spray water into the passage for the powder/granular material without removing the first driver from the powder/granular material spreader, and therefore it is possible to clean the passage for the powder/granular material in the powder/granular material spreader easily.

Preferably, the housing further houses the second driver, and the passage further includes an integral second wall that shields the second driver from the passage. In this case, the second driver is housed in the housing, and not in the passage for the powder/granular material. Therefore, even if water is sprayed into the passage to clean the passage where the feeder is located, it is possible to reduce instances that water or fine particles of powdery/granular material reach the second driver. Also, when viewed from the passage, the second driver inside the housing is shielded by the second wall. Therefore, even if water is sprayed into the passage, water or fine particles of powder/granular material do not reach the second driver directly. As a result, it is possible to spray water into the passage for the powder/granular material without removing the second driver from the powder/granular material spreader, and therefore it is possible to clean the passage for the powder/granular material in the powder/granular material spreader more easily.

Further preferably, the passage section further includes an opening in the inlet of the passage, the housing includes an integral cover which covers tops and sides of the first driver and the second driver, the opening is integral with the first wall and the second wall, and the cover is fitted over an outer surface of the opening. In this case, the opening, the first wall, and the second wall define an integral component that has no joints or slits. Therefore, even if water is sprayed from the opening into the passage for the powder/granular material at the time of cleaning, it is possible to further reduce instances that water or fine particles of powder/granular material enter inside the housing from the passage. Also, since the cover of the housing is fitted to the outer surface of the opening of the passage, whereas tops and sides of the first driver and the second driver are covered by the cover, even if water is sprayed from above the housing, it is possible to reduce instances that the water enters inside the housing through the cover.

Further, preferably, the powder/granular material spreader further includes a seal provided between the opening and the cover. In this case, it is possible to further reduce instances that the water enters inside the housing from a gap between the opening and the cover.

Preferably, the feeder includes a roller having a rotation axis that extends transversely to a direction in which the passage extends from its inlet toward its outlet, and the passage further includes a through-hole which allows removal of the roller from the passage in a direction of the rotation axis. In this case, at the time of cleaning, it is possible to easily remove the roller, which is provided in the passage for the powder/granular material, through the through-hole by moving in the direction of the rotation axis. Therefore, it is possible to clean the roller easily after being separated from the passage.

Further preferably, the first driver and the second driver sandwich the passage therebetween, and the first wall and the second wall sandwich the passage therebetween. In this case, the arrangement that the first driver and the second driver which are housed in the housing are disposed to sandwich the passage for the powder/granular material makes it possible to make the powder/granular material spreader compact. Also, even if the powder/granular material spreader has such a compact configuration, it is possible with the first wall and the second wall to reduce instances that water or fine particles of powder/granular material reach the first driver and the second driver directly.

In preferred embodiments of the present invention, the term "integral" means a single unitary element or component having no joints or slits.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is an illustrative sectional drawing taken along line A-A in FIG. 4.

DETAILED DESCRIPTION OF THE PREFERRED EMBODIMENTS

Hereinafter, preferred embodiments of the present invention will be described with reference to the drawings. The description will cover a case in which a powder/granular material spreader 10 according to a preferred embodiment of the present invention is installed on a multicopter 1 which is an example of the transport equipment. The terms front and rear, left and right, above and below in the powder/granular material spreader 10 according to the preferred embodiments of the present invention refer to front and rear, left and right, above and below based on a basic attitude of the multicopter 1 in which the powder/granular material spreader 10 is installed. The basic attitude of the multicopter 1 is an attitude when the multicopter 1 is on a horizontal plane. In the attached drawings, symbols "Fr" indicates forward, "Rr" indicates rearward, "R" indicates rightward, "L" indicates leftward, "Up" indicates upward, and "Lo" indicates downward, respectively. Also, the powder/granular material to be spread is, for example, a granular material provided by a chemical in granular form.

Figure 1:
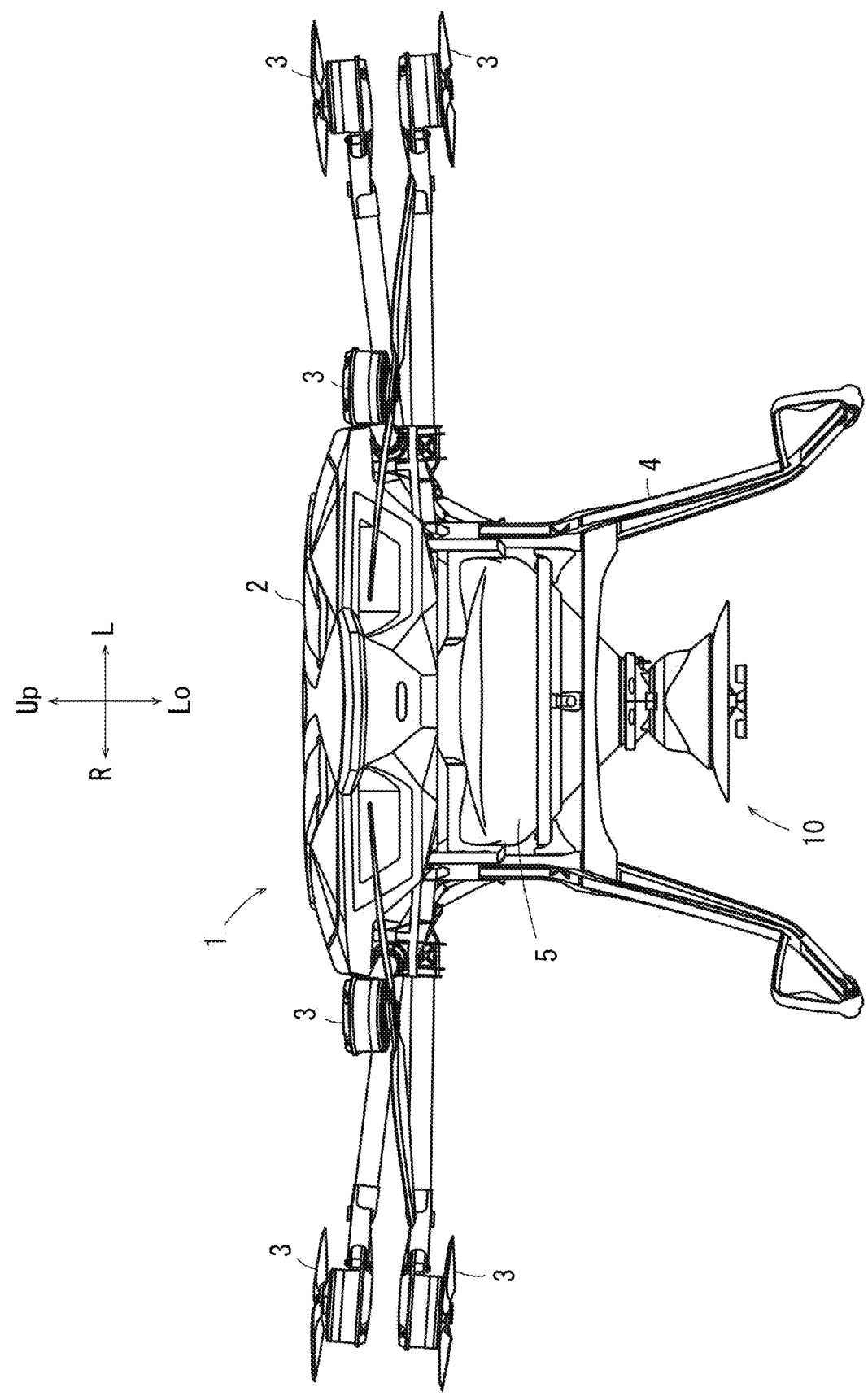
FIG. 1 is a front view which shows a multicopter equipped with a powder/granular material spreader according to a preferred embodiment of the present invention.
Figure 2:
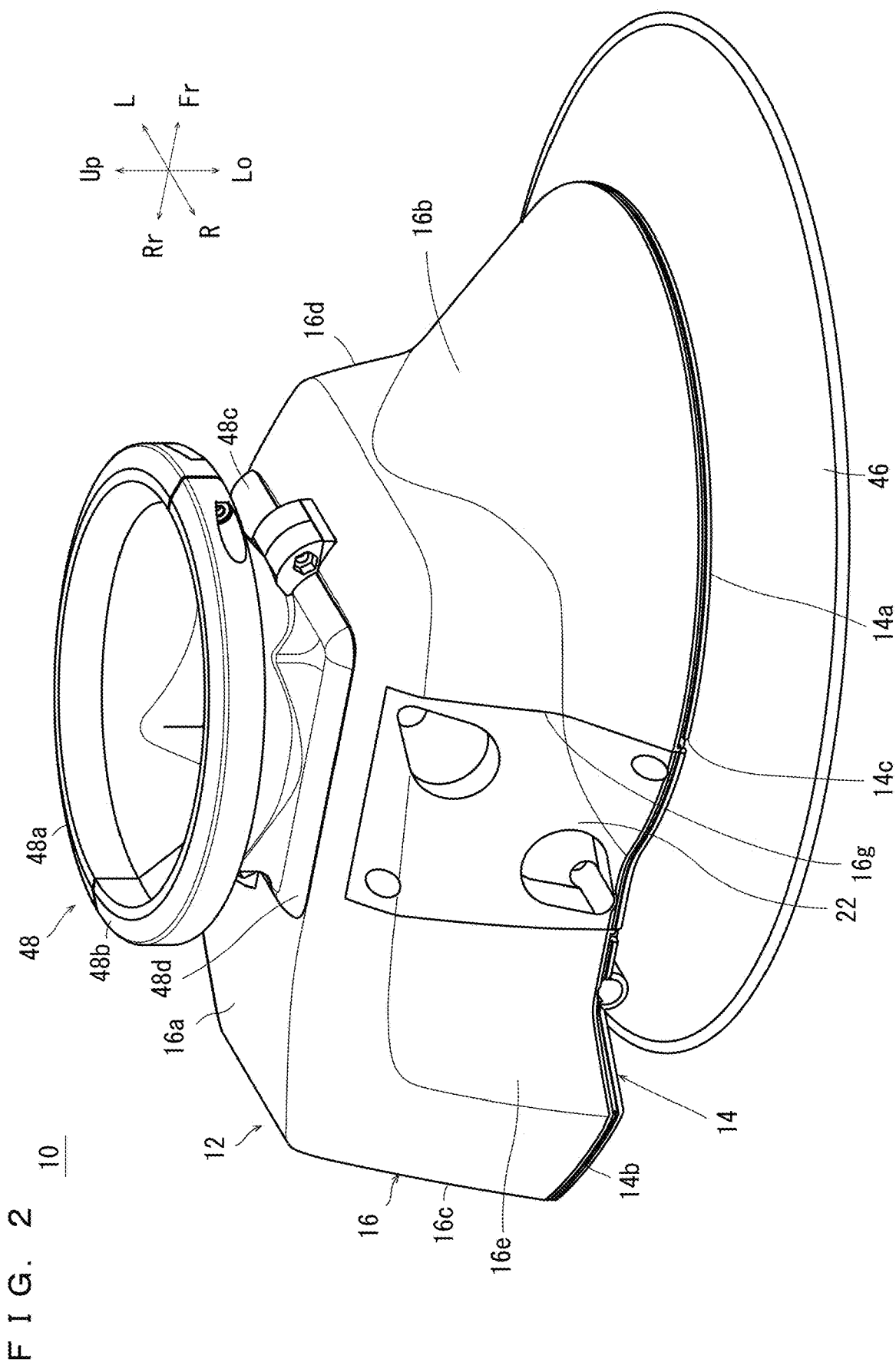
FIG. 2 is a perspective view of the powder/granular material spreader from an obliquely right and front view point.
Figure 3:
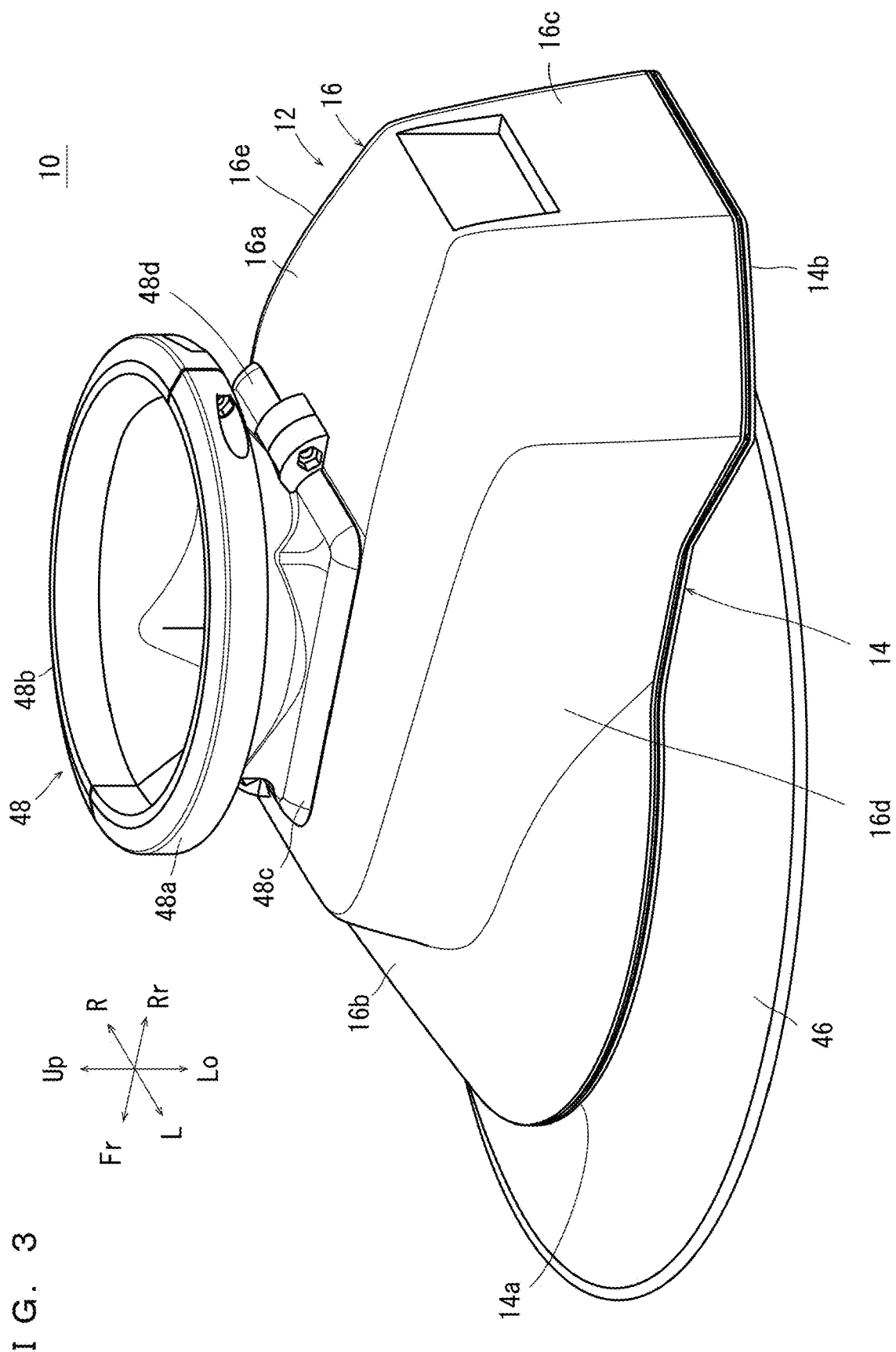
FIG. 3 is a perspective view of the powder/granular material spreader from an obliquely left and rear view point.
Figure 4:
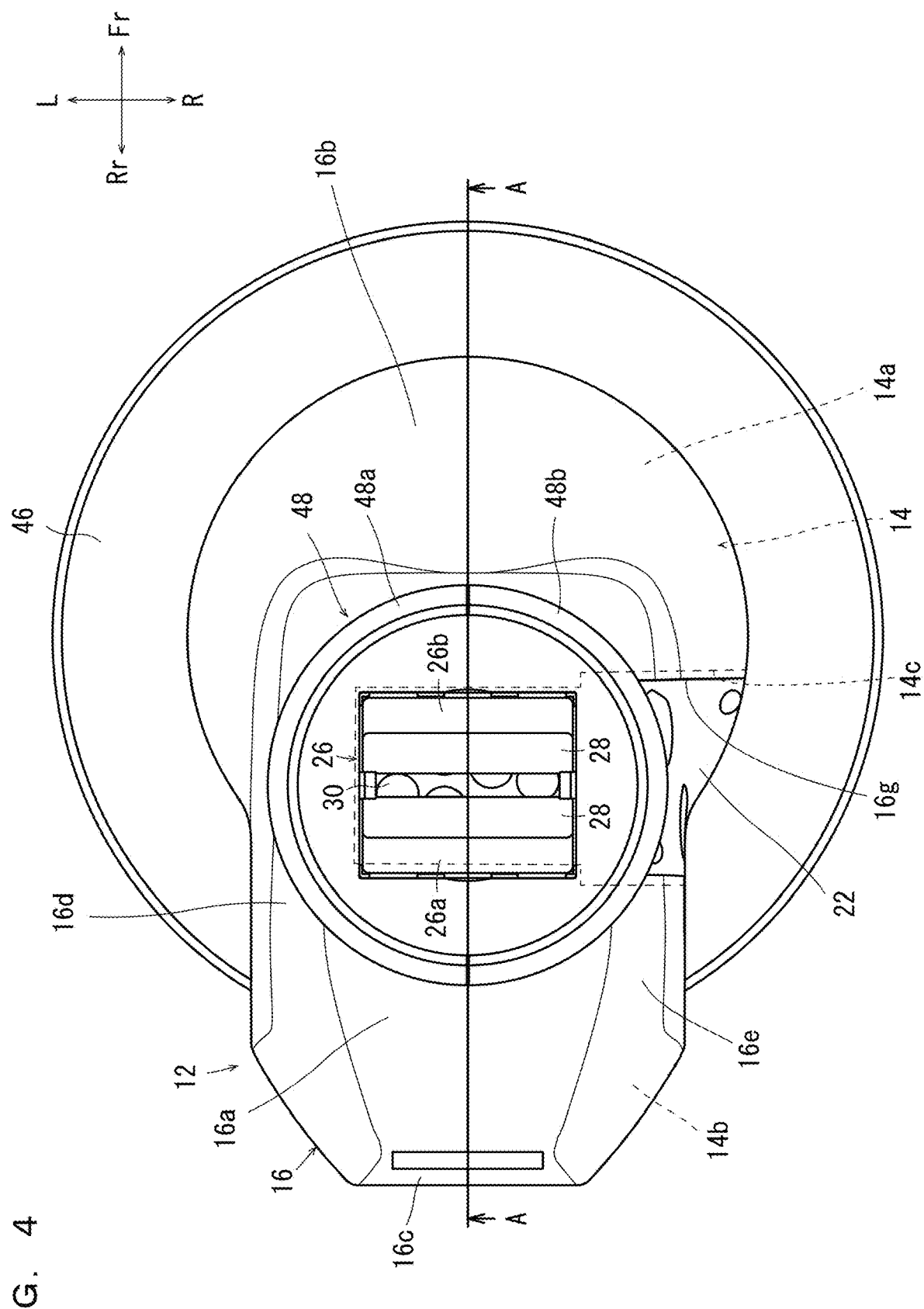
FIG. 4 is a plan view of the powder/granular material spreader.

Referring to FIG. 1, the multicopter 1 includes a main body 2, a plurality (eight in the present preferred embodiment but only six appearing in the drawings) of rotor blade sections 3 extending laterally from the main body 2, and a leg unit 4 extending downward from the main body 2. The leg unit 4 supports a hopper 5 in which the granular material is stored. The powder/granular material spreader 10 is attached to a lower end portion of the hopper 5.

Referring to FIG. 2 through FIG. 7, the powder/granular material spreader 10 includes a housing 12. The housing 12 preferably has a hollow, substantially box-shaped structure, and includes a bottom portion 14 and an integral cover 16 assembled to the bottom portion 14.

The bottom portion 14 is preferably plate-shaped, and includes a front portion 14a and a rear portion 14b. Between the front portion 14a and the rear portion 14b, there is provided a cutout 14c recessed from right to left (see FIG. 4). Therefore, the bottom portion 14 is substantially U-shaped in a plan view.

The cover 16 includes a ceiling 16a, a front wall 16b, a rear wall 16c, a left side wall 16d, and a right side wall 16e, and defines an integral component including a bottom opening. The ceiling 16a includes a rectangular through-hole 16f while the right side wall 16e includes a rectangular cutout 16g recessed upward from below. The through-hole 16f and the cutout 16g are located at positions corresponding to the cutout 14c of the bottom portion 14. In other words, when the cover 16 is assembled to the bottom portion 14 of the housing 12, the through-hole 16f and the cutout 16g extend above the cutout 14c of the bottom portion 14. The through-hole 16f is sized to be fitted with an opening 18c (which will be described below) of a passage section 18. The cutout 16g has substantially the same size as a through-hole 20c (which will be described below) of a guide 20 and is fitted with a side cover 22 (which will be described below). The cutout 14c is sized to be fitted by lower end portions of the passage section 18, the guide 20, and the side cover 22.

The passage section 18, the guide 20, and the side cover 22 are attached to the housing 12 which is constructed as described above.

Figure 8A:
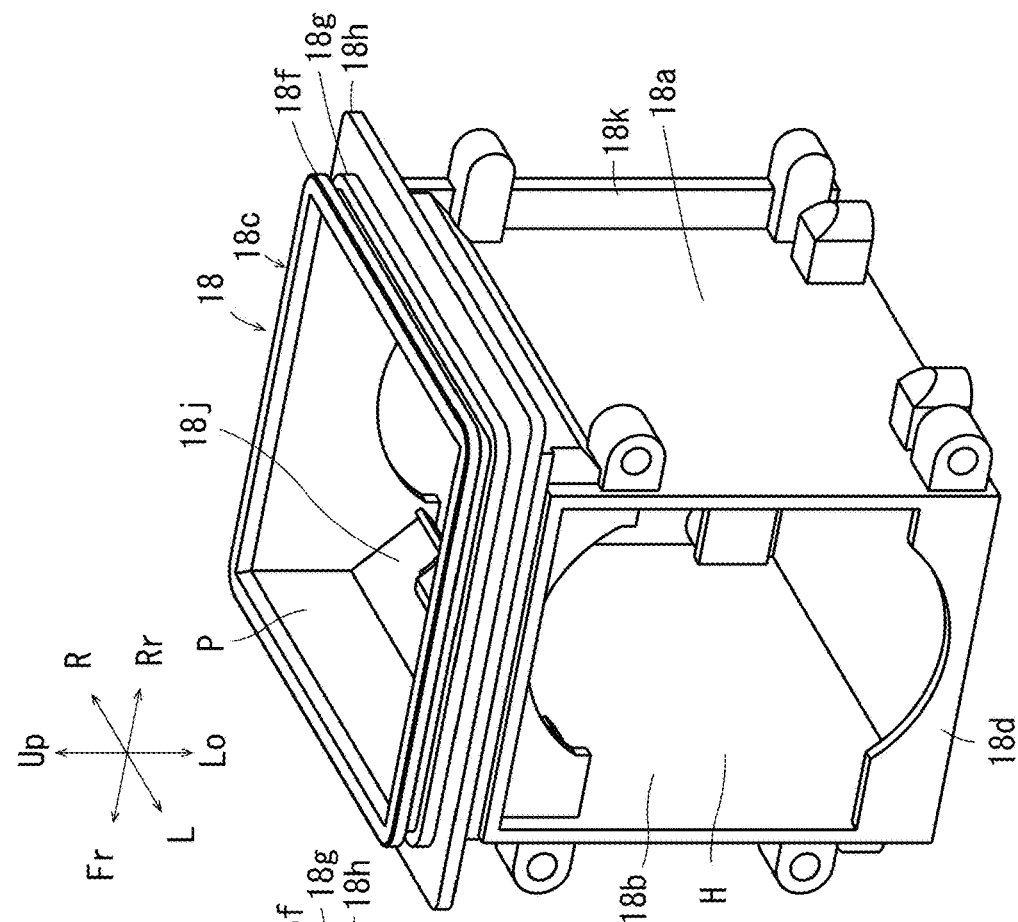
FIG. 8A is a perspective view of a passage section from an obliquely right and front view point.
Figure 8B:
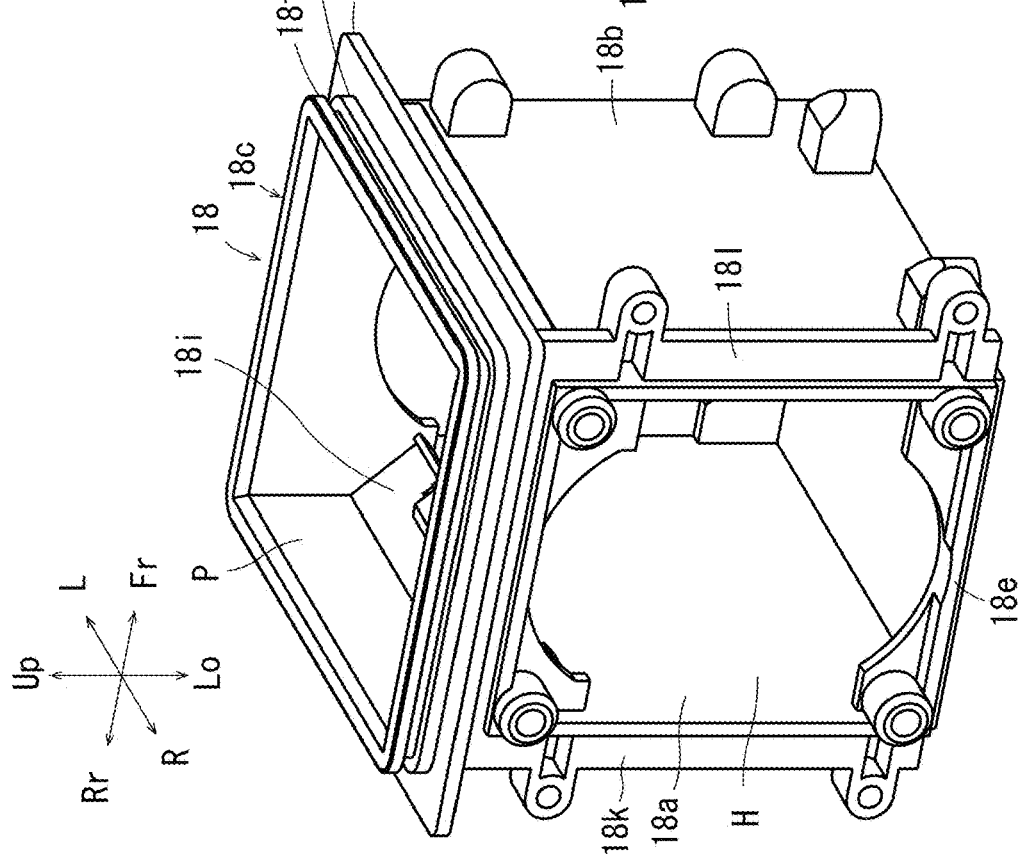
FIG. 8B is a perspective view of the passage section from an obliquely left and rear view point.

Referring to FIGS. 8A and 8B, the passage section 18 preferably has a hollow, substantially box-shaped structure, and includes an integral first wall 18a, an integral second wall 18b, an opening 18c, a left frame 18d, and a right frame 18e. The first wall 18a and the second wall 18b are parallel or substantially parallel to each other, spaced apart from each other in the front-rear direction, and are plate-shaped or substantially plate-shaped. The first wall 18a and the second wall 18b define a passage P (which will be described below) therebetween. The opening 18c is located at an inlet of the passage P, and has a substantially rectangular, frame-shaped, integral portion. The opening 18c connects respective upper end portions of the first wall 18a and the second wall 18b. The first wall 18a, the second wall 18b, and the opening 18c are preferably integral with each other. The left frame 18*d* connects respective left lower end portions of the first wall 18*a* and the second wall 18*b*. The right frame 18*e* connects respective right lower end portions of the first wall 18*a* and the second wall 18*b*. Therefore, the first wall 18*a*, the second wall 18*b*, the opening 18*c*, the left frame 18*d*, and the right frame 18*e* are integral. The left frame 18*d* and the right frame 18*e* are located at an outlet of the passage P. Accordingly, in the arrangement described above, the passage P for the granular material defines a through-hole extending in the up-down direction, and includes a through-hole H extending in the left-right direction inside the passage section 18. The through-hole H allows access to remove a roller 30 (which will be described below) from the passage P in the direction of a rotation axis.

The opening 18*c* includes, at its upper end portion, flanges 18*f*, 18*g*, and 18*h* extending outward and annularly around the passage P. The flanges 18*f*, 18*g*, and 18*h* are located in this order from top to bottom. The flange 18*f* is located at an upper end of the passage section 18. The flange 18*g* is located below the flange 18*f* with a slight gap therefrom. The flange 18*h* is continuous with the flange 18*g*. The flanges 18*f* and 18*g* extend outwardly by substantially the same amount, while the flange 18*h* extends outwardly by a greater amount than the flanges 18*f* and 18*g*. Inner upper portions of the first wall 18*a* and the second wall 18*b* include obliquely downward tilting sloped portions 18*i* and 18*j*. Further, outer surface right ends of the first wall 18*a* and the second wall 18*b* include frames 18*k* and 18*l* extending in the up-down direction.

The passage section 18 has its lower end portion fit into the cutout 14*c* of the bottom portion 14, and its upper end portion (the opening 18*c*) fit into the through-hole 16*f* of the cover 16 when attached to the housing 12. Accordingly, as described above, the passage section 18 is located in the housing 12 to extend through the housing 12 in the up-down direction. With this arrangement, a seal 24 is located between an upper end portion of the passage section 18 and the cover 16 (see FIG. 7). In other words, the flanges 18*g* and 18*h* of the opening 18*c* of the passage section 18 and an inner edge portion 16*h* of the ceiling 16*a* of the cover 16 are fitted to each other with the seal 24 sandwiched in between. More specifically, the cover 16 is fitted to an outer surface of the opening 18*c*, and the seal 24 is located where the cover 16 and the opening 18*c* are fastened to each other. The seal 24 is preferably ring-shaped, and fits all around the flange 18*g* of the opening 18*c*.

Figure 5:
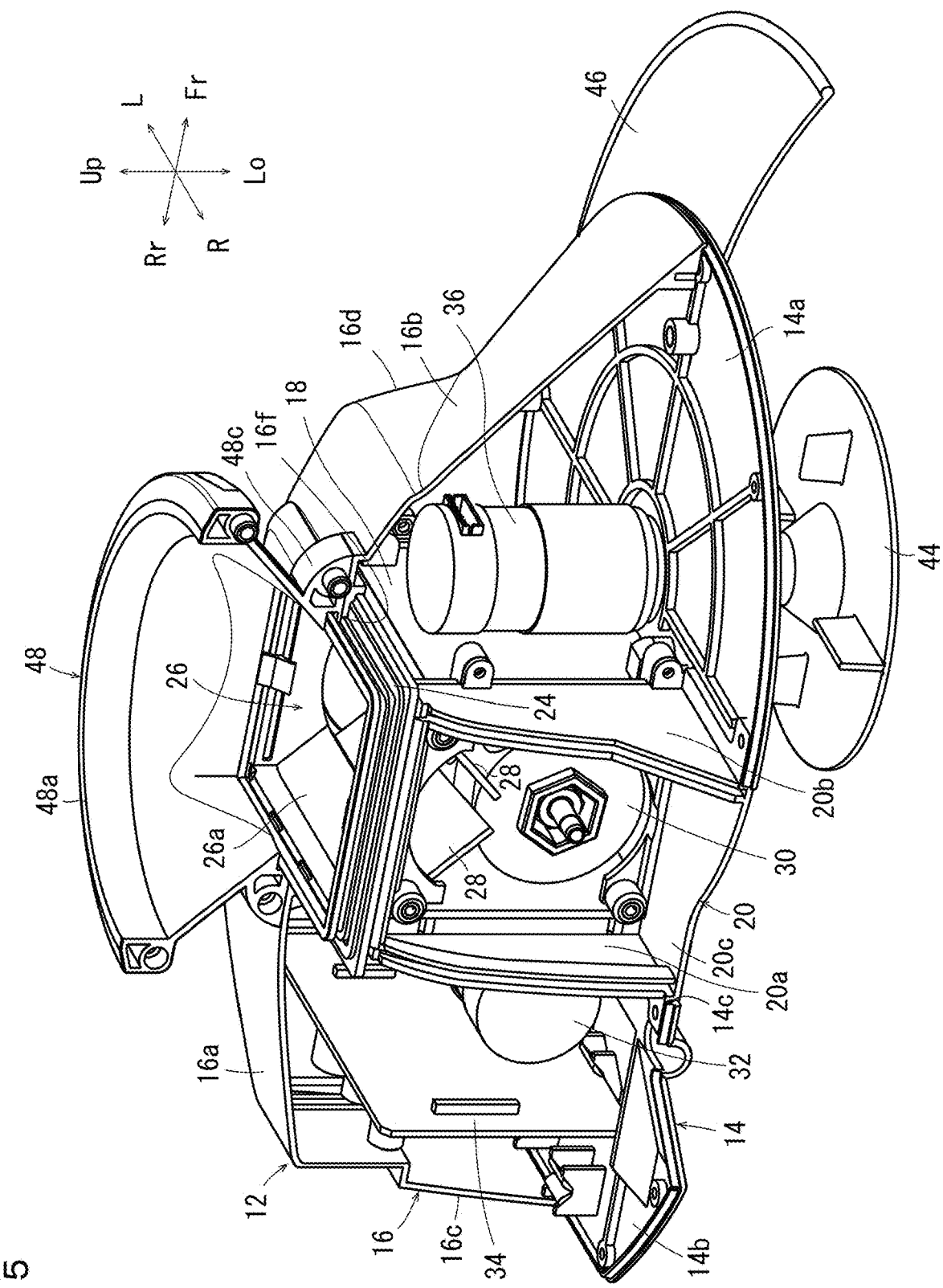
FIG. 5 is a perspective view of the powder/granular material spreader from an obliquely right and front view point without illustrating a right half of a cover, a right half of a joint, or a side cover.

Referring to FIG. 5, the guide 20 has a substantially rectangular frame shape and includes frames 20*a* and 20*b* and a through-hole 20*c*. The frames 20*a* and 20*b* extend in the up-down direction, and are spaced apart from each other. The guide 20 is located on the right side of the passage section 18 to make the through-hole 20*c* and the through-hole H of the passage section 18 continuous with each other. In other words, the guide 20 is located on a side from which the roller 30 is to be removed, with respect to the passage section 18. In this arrangement, the frames 20*a* and 20*b* of the guide 20 are sealingly fixed to the frames 18*k* and 18*l* of the passage section 18 respectively. As a result, water cannot enter from between the frames 18*k* and 20*a*, or between the frames 18*l* and 20*b*. The lower end portion of the guide 20 fits into the cutout 14*c* of the bottom portion 14, while the through-hole 20*c* of the guide 20 is in alignment with the cutout 16*g* of the cover 16. As a result of the arrangement described above, an inner space of the housing 12 is divided generally into a front portion and a rear portion by the passage section 18 and the guide 20. The side cover 22 fits into the cutout 16*g* of the cover 16 and into the through-hole 20*c* of the guide 20.

Referring to FIG. 5 and FIG. 7, a brush holder 26 is provided at an upper area inside the passage section 18. The brush holder 26 has a substantially rectangular frame shape along an inner circumferential surface of the passage section 18, and includes sloped portions 26*a* and 26*b* extending along the sloped portions 18*i* and 18*j* of the passage section 18. The sloped portions 26*a* and 26*b* support respective ones of obliquely downward extending plate-shaped brushes 28. The roller 30 is disposed below the brushes 28 inside the passage section 18 (the passage P). The roller 30 includes a rotation shaft 30*a* and a cylindrical roller main body 30*b* which rotates together with the rotation shaft 30*a*. The roller main body 30*b* has an outer side surface provided with a plurality of recesses 30*c*. The roller 30 is disposed so that a direction of its rotation axis is in the left-right direction. As a result, the roller 30 is disposed such that its rotation axis extends transversely to a direction in which the passage P extends from its inlet toward its outlet (indicated by Arrow B in FIG. 7). In the present preferred embodiment, the direction of the rotation axis of the roller 30 is perpendicular or substantially perpendicular to a longitudinal direction, which is the up-down direction, of the passage P.

Figure 6:
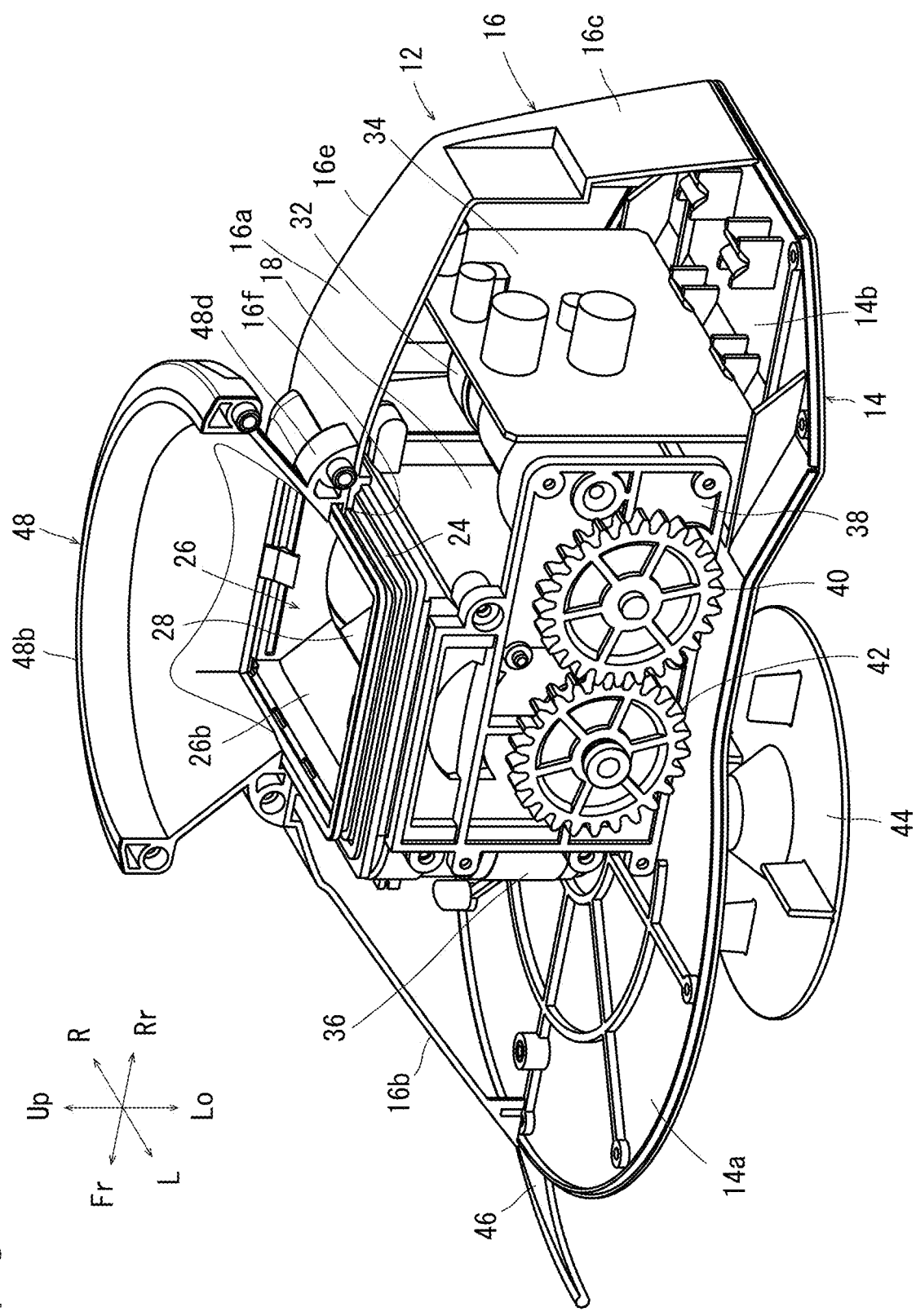
FIG. 6 is a perspective view of the powder/granular material spreader from an obliquely left and rear view point without illustrating a left half of the cover or a left half of the joint.

Referring to FIG. 5 through FIG. 7, a motor 32 and a circuit substrate 34 are located inside the housing 12 behind the passage section 18. A motor 36 is located inside the housing 12 in front of the passage section 18. In other words, the motor 32 and the motor 36 are located to sandwich the passage P. The motor 32 is shielded from the passage P by the first wall 18*a*, while the motor 36 is shielded from the passage P by the second wall 18*b*. In other words, the region where the motor 32 is disposed is isolated from the passage P by the first wall 18*a*, while the region where the motor 36 is disposed is isolated from the passage P by the second wall 18*b*. A base plate 38 is attached to a left side surface of the passage section 18. The motor 32 is attached to the base plate 38 so that a direction of its rotation axis is in the left-right direction. The motor 32 and the roller 30 are disposed in the same direction. The circuit substrate 34 is disposed at a more rearward position than the motor 32, and is disposed so that its main surface extends in leftward, rightward, upward, and downward directions. The motor 36 is disposed so that a direction of its rotation axis is in the up-down direction. The roller 30 and the motor 32 are connected with each other via a driving gear 40 which is attached to an end portion (left end portion) of the motor 32 and a driven gear 42 which is attached to an end portion (left end portion) of the roller 30. To feed the granular material supplied from the inlet of the passage P toward the outlet of the passage P, the roller 30 is driven by the motor 32. A rotating speed of the roller 30 determines a dropping amount of the granular material. The motors 32, 36, the circuit substrate 34, the base plate 38, the driving gear 40, and the driven gear 42 have their upper portions and side portions covered by the cover 16, whereas their lower portions are covered by the bottom portion 14. A spinner 44, which is connected with the motor 36 provided inside the housing 12, is disposed below the front section 14*a* of the bottom portion 14 of the housing 12. The spinner 44 is driven by the motor 36 to spread the granular material which is delivered from the outlet of the passage P. A rotating speed of the spinner 44 determines a spreading range of the granular material. The bottom portion 14 has a lower surface to which a guard 46 is attached and covers an upper portion of the spinner 44. The guard 46 has an umbrella-shaped portion 46*a*, a guide

46*b*, and a hollow portion 46*c*. The umbrella-shaped portion 46*a* is hollow. By adjusting the size of umbrella-shaped portion 46*a* it is possible to adjust a spreading range of the granular material. The guide 46*b* extends obliquely downward from an inner circumferential edge of the umbrella-shaped portion 46*a* in order to guide the granular material from the outlet of the passage P to the spinner 44. The hollow portion 46*c* corresponds to the outlet of the passage P of the passage section 18.

A funnel-shaped joint 48 is attached to the opening 18*c* of the passage section 18. The joint 48 has a two-part structure, includes halves 48*a* and 48*b*. The half 48*a* includes a lower end portion 48*c*, which is positioned to sandwich the flange 18*f* of the opening 18*c* from above and below and then slid with respect to the flange 18*f* from left to right to fit over the flange 18*f*. The half 48*b* includes a lower end portion 48*d*, which is positioned to sandwich the flange 18*f* of the opening 18*c* from above and below and then slid with respect to the flange 18*f* from right to left to fit over the flange 18*f*. Then, the halves 48*a* and 48*b* are assembled to each other. In this step, the lower end portions 48*c* and 48*d* press an upper surface of the inner edge portion 16*h* of the cover 16, bringing the seal 24 under strong pressure between the inner edge portion 16*h* of the cover 16 and the flange 18*h* of the opening 18*c*, to provide improved sealing by the seal 24. By fitting the lower end portions 48*c* and 48*d* over the flange 18*f* of the opening 18*c* and then assembling the halves 48*a* and 48*b* to each other as described, it is possible to attach the joint 48 to the passage section 18 without using bolts, and also provide a seal structure by pressing the seal 24. The joint 48 has its upper portion fastened to a lower end portion of the hopper 5, such that the powder/granular material spreader 10 is connected with the hopper 5.

In the present preferred embodiment, the motor 32 is a non-limiting example of the first driver. The motor 36 is a non-limiting example of the second driver. The roller 30 is a non-limiting example of the feeder. The spinner 44 is a non-limiting example of the spreader.

In the powder/granular material spreader 10 described above, the granular material inside the hopper 5 is supplied to the passage section 18 (the passage P) via the joint 48, and further, guided onto the roller main body 30*b* by the brushes 28 and fills the recesses 30*c*. Then, as the roller 30 is rotated by the motor 32, the granular material is struck by the brushes 28, and the granular material inside the recesses 30*c* moves down. Thereafter, the granular material falls from the outlet of the passage section 18 (the passage P) onto the spinner 44 via the guide 46*b* of the guard 46, and then is spread by being thrown due to the rotation of the spinner 44.

Figure 9:
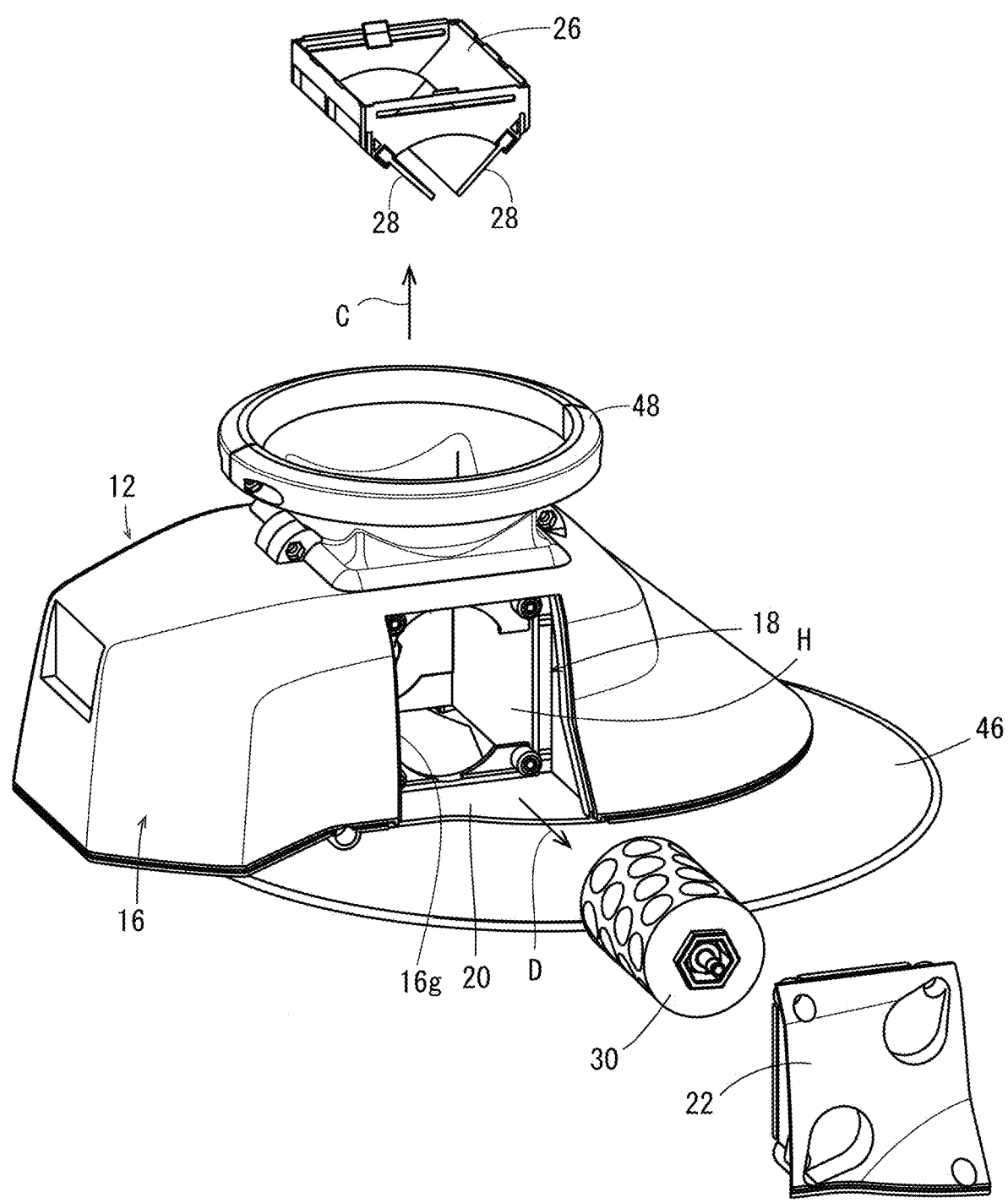
FIG. 9 is an illustrative drawing of the powder/granular material spreader from which a brush holder, a brush, a side cover, and a roller are removed.
Figure 10:
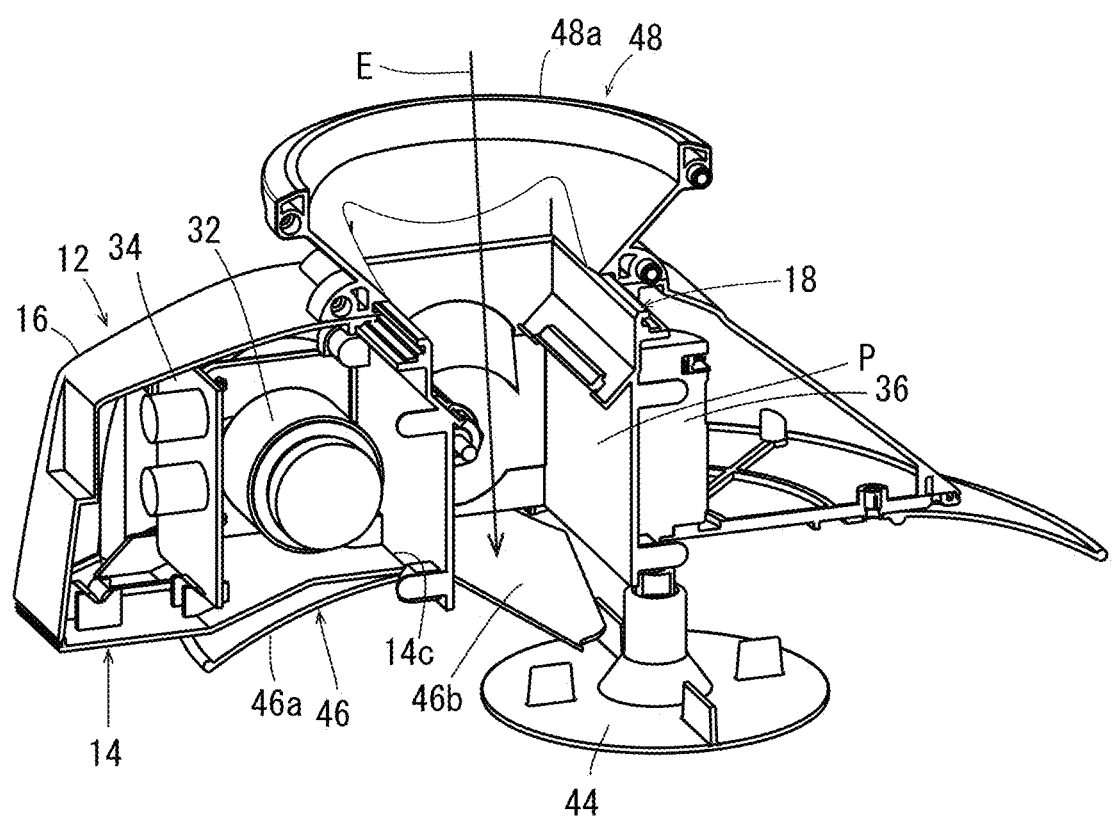
FIG. 10 is an illustrative drawing for explaining a method of cleaning the powder/granular material spreader.

Referring to FIG. 9, when cleaning the powder/granular material spreader 10, the brush holder 26 and the brushes 28 are removed in the upward direction through the joint 48 as shown in Arrow C, and then the brush holder 26 and the brushes 28 are cleaned. Also, the side cover 22 is removed through the cutout 16*g* of the cover 16, and further the roller 30 is pulled out sideways as indicated by Arrow D, (in the direction of its rotation axis), and the side cover 22 and the roller 30 are cleaned. Further, referring to FIG. 10, as indicated by Arrow E, water is poured into the passage section 18 from the side where the joint 48 is located, and the passage P is cleaned.

According to the powder/granular material spreader 10 described above, the motor 32 is housed in the housing 12, and not in the passage P for the granular material. Therefore, even if water is sprayed into the passage P in order to clean the passage P where the roller 30 is located, it is possible to reduce instances that water or powdery granular material reach the motor 32. Also, when viewed from the passage P, the motor 32 inside the housing 12 is shielded by the first wall 18*a*. Therefore, even if water is sprayed into the passage P, water or powdery granular material does not reach the motor 32 directly. As a result, it is possible to spray water into the passage P for the granular material without removing the motor 32 from the powder/granular material spreader 10, and therefore it is possible to clean the passage P for the granular material of the powder/granular material spreader 10 easily.

Likewise, the motor 36 is stored in the housing 12, and not in the passage P for the granular material. Therefore, even if water is sprayed into the passage P in order to clean the passage P where the roller 30 is located, it is possible to reduce instances that water or powdery granular material reach the motor 36. Also, when viewed from the passage P, the motor 36 inside the housing 12 is shielded by the second wall 18*b*. Therefore, even if water is sprayed into the passage P, water or powdery granular material does not reach the motor 36 directly. As a result, it is possible to spray water into the passage P for the granular material without removing the motor 36 from the powder/granular material spreader 10, and therefore it is possible to clean the passage P for the granular material of the powder/granular material spreader 10 more easily.

The opening 18*c*, the first wall 18*a*, and the second wall 18*b* define an integral component that has no joints or slits. Therefore, even if water is sprayed from the opening 18*c* into the passage P for the granular material at the time of cleaning, it is possible to further reduce instances that water or powdery granular material enter inside the housing 12 from the passage P. Also, since the cover 16 of the housing 12 is fitted to the outer surface of the opening 18*c* of the passage section 18, whereas tops and sides of the motor 32 and the motor 36 are covered by the integral cover 16, even if water is sprayed from above the housing 12, it is possible to reduce instances that the water enters inside the housing 12 through the cover 16.

The seal 24 is provided at a joint between the opening 18*c* and the cover 16 (between the opening 18*c* and the inner edge portion 16*h* of the cover 16). Therefore, it is possible to further reduce instances that water enters inside the housing 12 from a gap between the opening 18*c* and the cover 16.

At the time of cleaning, it is possible to easily remove the roller 30, which is provided in the passage P for the granular material, through the through-hole H and the cutout 16*g* by moving in the direction of the rotation axis. Therefore, it is possible to clean the roller 30 easily and separately from the passage P. It is also possible to remove the brush holder 26, the brushes 28, and the side cover 22 easily from the powder/granular material spreader 10 as a complete product, and to clean the brush holder 26, the brushes 28, and the side cover 22 easily separately from the passage P.

The motor 32 and the motor 36 which are housed in the housing 12 are disposed to sandwich the passage P of the granular material in the passage section 18. This makes it possible to configure the powder/granular material spreader 10 compactly. Also, even if the powder/granular material spreader 10 has such a compact configuration, it is possible, with the first wall 18*a* and the second wall 18*b*, to reduce instances that water or powdery granular material reach the motor 32 and the motor 36 directly.

The joint 48 is attached to the passage section 18 without using bolts by fitting the lower end portions 48*c* and 48*d* over the flange 18*f* of the opening 18*c* and then assembling the halves 48*a* and 48*b* to each other. This improves work efficiency in the assembling operation. Also, due to the boltless structure, there is no problem that the bolt(s) will break when removing the joint 48 from the passage section 18.

In the preferred embodiments described above, description was made for a case in which a sealing structure is provided by pressing the seal 24 without using bolts. However, the present invention is not limited to this. Bolts may be used to press the seal 24 to provide the sealing structure.

In the preferred embodiments described above, the feeder is provided by the roller 30. However, the present invention is not limited to this. The feeder may be provided by a shutter.

In the preferred embodiments described above, the powder/granular material to be spread is a granular material provided by a chemical in granular form. However, the present invention is not limited to this. The powder/granular material may be provided by a fertilizer, for example.

In the preferred embodiments described above, description was made for a case in which the powder/granular material spreader 10 is installed on the multicopter 1. However, the present invention is not limited to this. The powder/granular material spreader is suitably installed on any transport equipment other than a multicopter, such as a flight vehicle, a water vessel and a ground vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A powder/granular material spreader comprising:
   a first driver;
   a housing that houses the first driver;
   a second driver;
   a passage extending through the housing to receive a powder/granular material;
   a feeder provided in the passage to feed the powder/granular material supplied from an inlet of the passage to an outlet of the passage and that is driven by the first driver; and
   a spreader driven by the second driver to spread the powder/granular material delivered from the outlet of the passage; wherein
   the passage includes a first wall integral with the passage to shield the first driver from the passage;
   the housing further houses the second driver;
   the passage further includes a second wall integral with the passage to shield the second driver from the passage;
   the passage further includes an opening at the inlet of the passage;
   the housing includes an integral cover to cover tops and sides of the first driver and the second driver;
   the opening is integral with the first wall and the second wall; and
   the cover is fitted over an outer surface of the opening.

2. The powder/granular material spreader according to claim 1, further comprising a seal provided between the opening and the cover.

3. The powder/granular material spreader according to claim 1, wherein
   the feeder includes a roller having a rotation axis that extends transversely to a direction in which the passage extends from an inlet of the passage to an outlet of the passage; and
   the passage further includes a through-hole which allows removal of the roller from the passage in a direction of the rotation axis.

4. The powder/granular material spreader according to claim 1, wherein
   the first driver and the second driver sandwich the passage therebetween; and
   the first wall and the second wall sandwich the passage therebetween.

* * * * *